(12) United States Patent
Fanelli et al.

(10) Patent No.: US 7,945,249 B2
(45) Date of Patent: May 17, 2011

(54) NEXT GENERATION SOCIAL NETWORKING AND CONTENT RATING SYSTEM AND METHOD

(75) Inventors: Bobby Fanelli, Allen, TX (US); William Dyer, Plano, TX (US); David Girard, Dallas, TX (US); Roberto Quintana, Allen, TX (US)

(73) Assignee: Alcatel Lucent, Paris (FR)

( * ) Notice: Subject to any disclaimer, the term of this patent is extended or adjusted under 35 U.S.C. 154(b) by 686 days.

(21) Appl. No.: 11/830,797

(22) Filed: Jul. 30, 2007

(65) Prior Publication Data

US 2008/0090598 A1    Apr. 17, 2008

Related U.S. Application Data

(60) Provisional application No. 60/829,211, filed on Oct. 12, 2006.

(51) Int. Cl.
*H04M 1/663* (2006.01)

(52) U.S. Cl. .................. 455/412.2; 455/518; 455/552.1; 455/3.03; 455/466

(58) Field of Classification Search .................. 455/518, 455/519, 424, 425, 456.5, 456.6, 414.1, 550.1, 455/90.2, 466, 1, 456.2, 412.2, 552.1, 556.1, 455/3.03, 459; 707/10, 3, 14, 1; 709/206, 313, 219; 726/3
See application file for complete search history.

(56) References Cited

U.S. PATENT DOCUMENTS

| | | | | |
|---|---|---|---|---|
| 2006/0253331 | A1* | 11/2006 | Shkedi | 705/14 |
| 2007/0021136 | A1* | 1/2007 | Allen | 455/518 |
| 2007/0162569 | A1* | 7/2007 | Robinson et al. | 709/219 |
| 2007/0179792 | A1* | 8/2007 | Kramer | 705/1 |
| 2007/0237321 | A1* | 10/2007 | Bloebaum et al. | 379/252 |
| 2007/0271234 | A1* | 11/2007 | Ravikiran | 707/3 |
| 2008/0009272 | A1* | 1/2008 | Toledano | 455/414.1 |
| 2008/0056235 | A1* | 3/2008 | Albina et al. | 370/352 |
| 2008/0109878 | A1* | 5/2008 | Delegue et al. | 726/3 |
| 2008/0306826 | A1* | 12/2008 | Kramer et al. | 705/14 |
| 2009/0176518 | A1* | 7/2009 | Doni | 455/466 |

* cited by examiner

*Primary Examiner* — Tan Trinh

(74) *Attorney, Agent, or Firm* — Capitol Patent & Trademark Law Firm, PLLC

(57) ABSTRACT

A system and method are described herein that leverages an IP (and in particular IMS) mobile network and a fixed network to provide a next generation social networking experience to the users of mobile terminals.

14 Claims, 17 Drawing Sheets

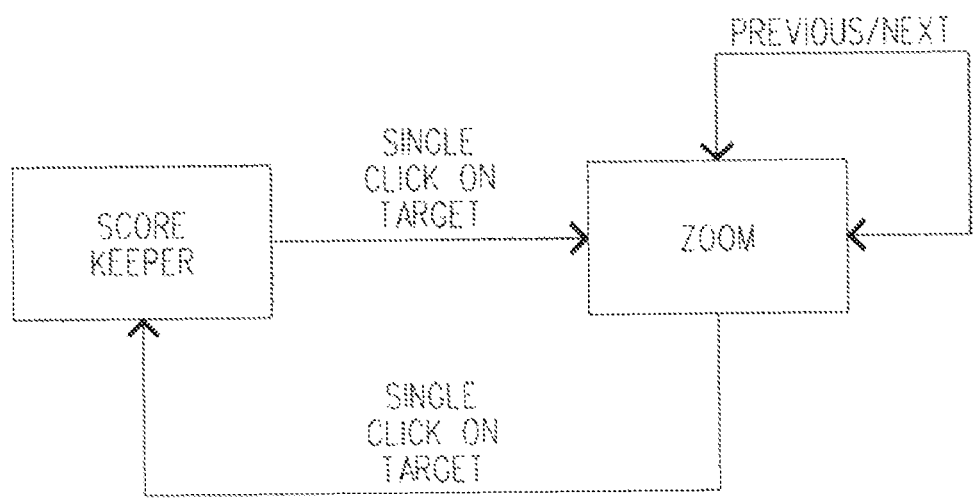
FIG. 16
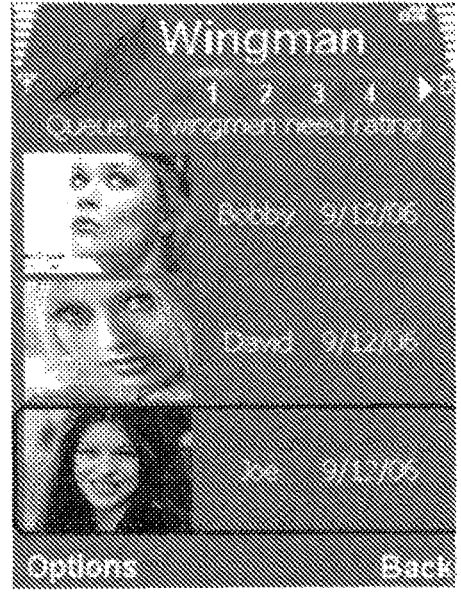
FIG. 17A    FIG. 17B

NEXT GENERATION SOCIAL NETWORKING AND CONTENT RATING SYSTEM AND METHOD

CLAIMING BENEFIT OF PRIOR FILED U.S. APPLICATION

This application claims the benefit of U.S. Provisional Application Ser. No. 60/829,211 filed on Oct. 12, 2006. The contents of this document are hereby incorporated by reference herein.

TECHNICAL FIELD

The present invention relates to a system (referred to herein as the "wingman system") and a method that leverages an IP (and in particular IMS) mobile network and a fixed network to provide a next generation social networking experience to users of mobile terminals.

BACKGROUND

Today the YouTube website (www.youtube.com) and the Dodgeball website (www.dodgeball.com) each provide a specific type of social networking service. For instance, the YouTube service enables people to post user generated content (e.g., photos, video) which can be downloaded and viewed by other people on a fixed computer. And, the Dodgeball service enables people to use their mobile phones to send text messages via the Dodgeball website which can inform other people (known as their "friends" or "crushes") of their current location. However, YouTube's service is limited to video sharing on a fixed computer and is not enabled for the mobile market. And, Dodgeball's service is dependent on a user's manual SMS registration with Dodgeball's website and does not provide a link so people can post and share their user generated content (e.g., photos, video). Plus, YouTube's service and Dodgeball's service do not rely on IMS to enable people to use their mobile terminal to post and send their user generated content (e.g., photos, video) to other people who can then view the user generated content on their mobile terminals. Thus, there has been and is a need for a new service that can leverage an IP (and in particular IMS) mobile network and a fixed network to provide a next generation social networking experience (which includes real-time communication and content sharing) to users of mobile terminals. This need and other needs are satisfied by the present invention.

SUMMARY

In one aspect, the present invention provides a method for socially networking a plurality of users of mobile terminals. The method comprising the steps of: (a) enabling a first user of a first mobile terminal to setup and view a personal list which includes selected other users of other mobile terminals; (b) enabling the first user of the first mobile terminal to view presence information which indicates availability of the other users of the other mobile terminals; (c) enabling the first user of the first mobile terminal to establish communications with one or more of the other users of the other mobile terminals; and (d) enabling the first user of the first mobile terminal to view posted content obtained by one or more of the other users of the other mobile terminals.

In another aspect, the present invention provides a mobile terminal which has a user interface, a camera and a processor which implements an application that enables a user to: (a) setup and view a personal list which includes other users of other mobile terminals; (b) view presence information which indicates availability of the other users of the other mobile terminals; (c) establish communications with one or more of the other users of the other mobile terminals; and (d) view posted content which is obtained by one or more of the other users of the other mobile terminals.

In yet another aspect, the present invention provides a server including a database and a processor which implements an application that enables the following to be performed: (a) receive photos from one or more users of mobile terminals; (b) store the photos; and (c) distribute a voting queue image which contains all or a portion of the stored photos to one or more of the users of the mobile terminals.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIGS. 13-18 are diagrams which are used to help explain some of the different views that can be displayed to the users of the mobile terminals in accordance with the present invention.

DETAILED DESCRIPTION

The following terms and abbreviations are herewith defined, at least some of which are referred to in the following description associated with the present invention.

| | |
|---|---|
| CDMA | Code-Division Multiple Access |
| CSCF | Call Session Control Function |
| DSL | Digital Subscriber Line |
| GPRS | General Packet Radio Service |
| GUI | Graphical User Interface |
| IM | Instant Messaging |
| IMS | IP Multimedia Subsystem |
| IP | Internet Protocol |
| IPTV | IP Television |
| LAN | Local Area Network |
| MSRP | Message Session Relay Protocol |
| PDA | Personal Digital Assistant |
| RTP | Real-time Transfer Protocol |
| SIP | Session Initiation Protocol |
| SMS | Short Message Service |
| UDP | User Datagram Protocol |

-continued

| UML | Unified Modeling Language |
| UMTS | Universal Mobile Telecommunications System |
| URI | Uniform Resource Identifier |
| VoIP | Voice of IP |
| WiFI | Wireless Fidelity |
| WM | Wingman |
| Shooter | Someone who takes a picture. |
| Target | A photo that can be rated by wingmen. |
| Wingman | Male or female friend or buddy of the user that can be contacted by IM or voice call. A wingman can rate pictures and hook the user up to a target. Each wingman has wingmen of his/her own. |

Figure 1:
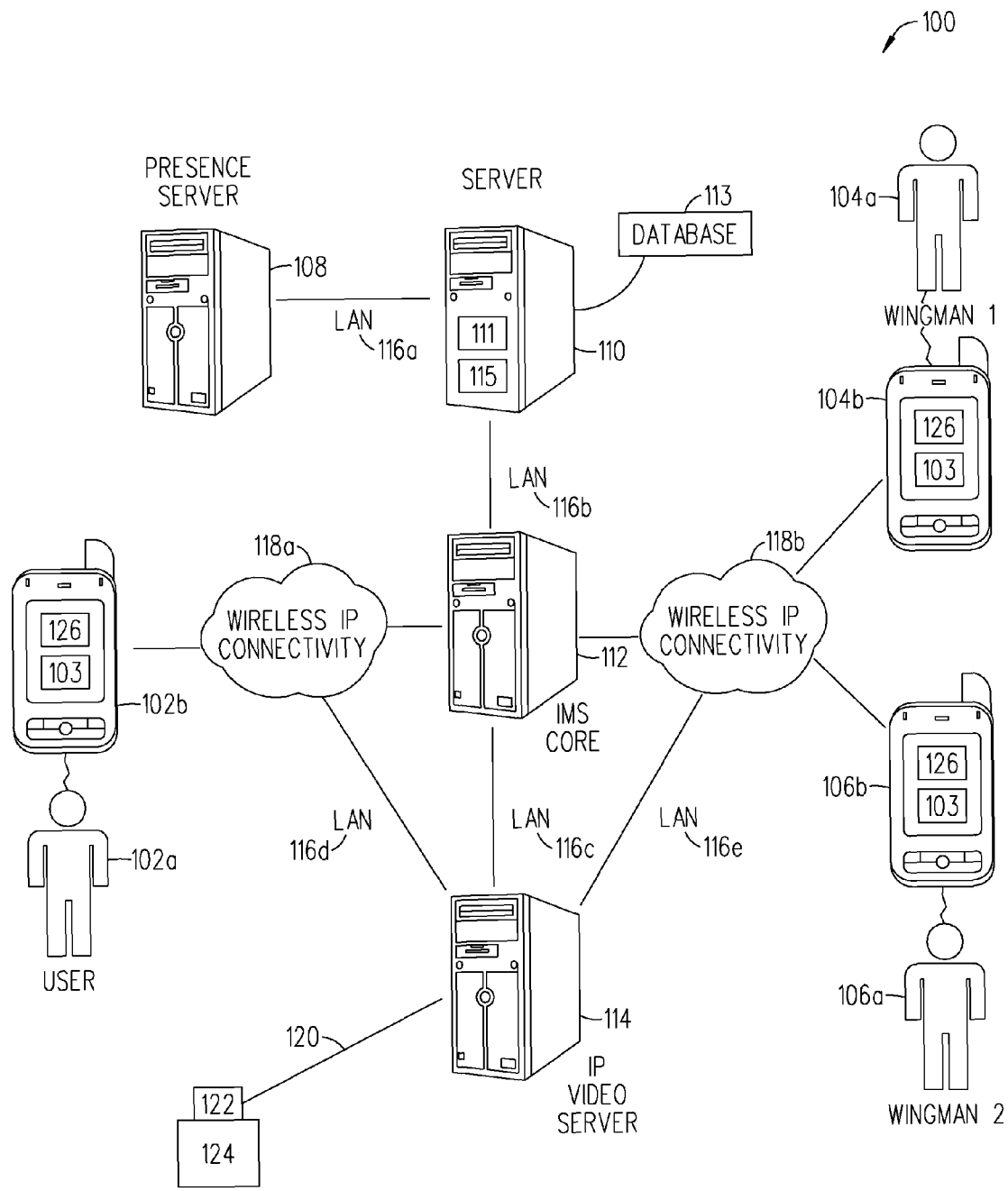
FIG. 1 is a block diagram illustrating the basic components of a system which provides a social networking experience to users that are carrying mobile terminals in accordance with the present invention.

Referring to FIG. 1, there is a block diagram illustrating the basic components of a system 100 which provides a social networking experience to users 102a, 104a and 106a that are respectively carrying mobile terminals 102b, 104b and 106b in accordance with the present invention (note: for clarity only three users 102a, 104a and 106a have been shown and described herein). The system 100 includes a presence server 108, a server 110 (including processor 111 (which implements a wingman servlet application 115) and a database 113), an IMS core 112 and an optional streaming server/IP video server 114. As shown, the presence server 108 is coupled via LAN 116a to the server 110 which is coupled via LAN 116b to the IMS core 112 which in turn is coupled via mobile networks 118a and 118b (which enable wireless IP connectivity via for example CDMA, WiFI, WiMAX, GPRS, UMTS) to the mobile terminals 102b, 104b and 106b. In addition, the IMS core 112 is coupled via LAN 116c to the streaming server/IP video server 114 (optional) which is coupled via LANs 116d and 116e to mobile networks 118a and 118b and is also coupled via an optical network/cable/DSL line 120 to a set-top box 122 and a television/computer 124 (shown associated with user 102a) (note 1: FIG. 1 is not to scale) (note 2: the wingman application discussed herein is preferably access agnostic such that it can be utilized in all wireless access technologies and wired technologies).

In operation, the system 100 leverages the IP (and in particular IMS) mobile network 112, 118a and 118b and a fixed network 108, 110 and 114 to provide a next generation social networking experience to the users 102a, 104a and 106a of mobile terminals 102b, 104b and 106b (e.g., PDAs 102b, 104b and 106b). As discussed below, the mobile terminals 102b, 104b and 106b each have a processor 103 located therein that implements a standalone application 126 (referred to herein as the wingman application 126) which enables their users 102a, 104a and 106a to do a variety of things such as the following from the viewpoint of user 102a:

- Define a personal list of users 104a and 106a (known as "contacts" or "wingmen") and view their presence information (which indicates whether or not they are available or currently using their mobile terminals 104b and 106b).
- Instantly setup an IM interaction or voice call (VoIP call) with their wingmen 104b and 106b by simply selecting them from their specialized wingmen list.
- Browse the posted content/"contenders" (i.e. photos or short videos) taken by their wingmen 104b and 106b.
- Rate (vote) the posted content (note: the server 110 keeps score of the rated posted content to help stimulate a conversation between users 102a, 104a and 106a).
- Notify their wingmen 104b and 106b when they have a "crush" on a contender (e.g., man or woman in the posted content) so they can help establish communication with their crush.
- View the physical location that the posted content was taken to provide visibility to where the wingmen 104b and 106b are located when they are visiting the "hot spots" while out on the town (this is the "social gravity" feature).
- Submit new posted content to be viewed by their wingmen 104b and 106b.
- Etc . . .

A detailed discussion about each of these particular features ("use cases") and additional features which are associated with the social networking application of the present invention are provided next with respect to FIGS. 2-12.

Application Start-Up

The user 102a interfaces with their mobile terminal 102b to log into the wingman application 126 so they can register with the server 110 (the wingman servlet application 115). Upon starting the wingman application 126, the login view is displayed on the mobile terminal 102b (see the image shown in FIG. 2A) and then after successfully interfacing with the login view the setup view (my profile tab) is displayed on the mobile terminal 102a (see the image shown in FIG. 2B). And, when the user 102a single clicks on the setup view, the mobile terminal 102b displays the wingmen list view (wingmen tab) (see the image shown in FIG. 2C). If the user 102a selects the wingmen tab too early, then the list could still be under construction but it will be updated automatically.

Figure 2A:
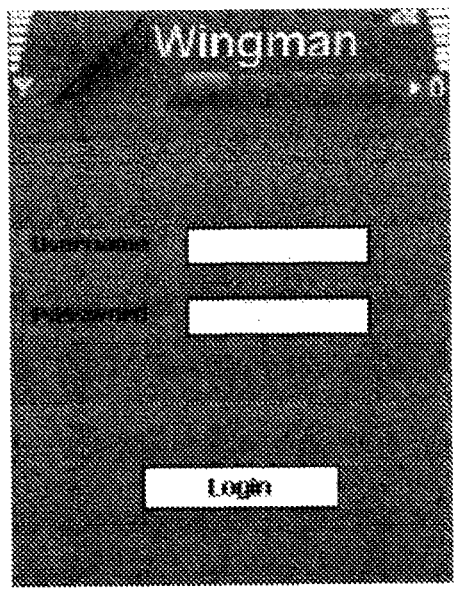
FIGS. 2-12 are diagrams which are used to help explain some of the different features that can be provided by the system shown in FIG. 1 in accordance with the present invention.
Figure 2B:
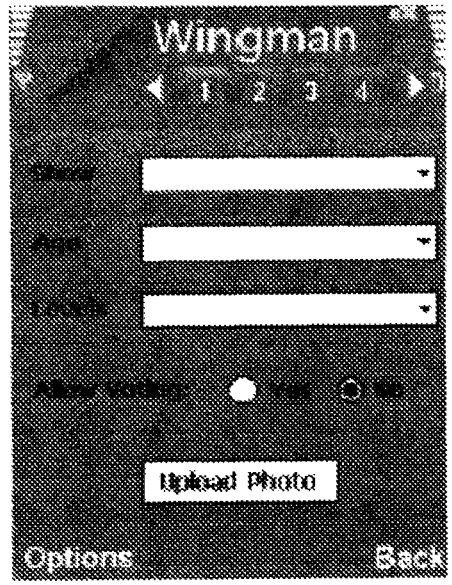

A purpose of this feature is to register the user 102a at the server 110 and to enable the user 102a to subscribe to view the presence information of his wingmen 104a and 106a (note: the wingmen 104a and 106a would already be registered with the server 110). There are several preconditions that should be satisfied before performing the application start-up which are as follows (for example): (1) the IMS core 112 (IMS proxy platform) is running; (2) the mobile terminal 102b has an IP connection to the IMS proxy platform; (3) the user 102a has not yet registered with the server 110; and (4) the mobile terminal 102b is not running the wingman application 126. FIG. 2D is a signal flow diagram which illustrates how the user 102a can start-up the wingman application 126 within their mobile terminal 102b. The steps are as follows:

1. User 102a starts the wingman application 126 in mobile terminal 102b.
2. Wingman application 126 displays a ShowLoginView( ) for user 102a (see FIG. 2A).
3. User 102a provides Login( ) information to wingman application 126 (note: if incorrect credentials are provided by the user 102a then the login fails and the user 102 remains in the login view).
4. Wingman application 126 sends a REGISTER: message to the IMS Core 112.
5. IMS Core 112 sends an OK: message to the wingman application 126 (note: the user 102a would be notified if the registration failed and the wingman application 126 cannot be used).
6. Wingman application 126 sends a PUBLISH: message to the IMS Core 112.
7. IMS Core 112 sends an OK: message to the wingman application 126.
8-10. Wingman application 126 displays a ShowSetupView( ) for user 102a and also performs the following operations: ReadBuddyList( ) and CreateBuddyDataStore( ) (see FIG. 2B).
11. Wingman application 126 sends a SUBSCRIBE: message to IMS Core 112 (to subscribe to their buddies/wingmen 104a and 106a).
12. IMS Core 112 sends a SUBSCRIBE: message to presence server 108.

13. Presence server 108 sends an OK: message to IMS Core 112.
14. IMS Core 112 sends an OK: message to wingman application 126.
15. Presence server 108 sends a NOTIFY: message to IMS Core 112 (note: a notify message is sent for each present buddy/wingman 104a and 106a).
16-17. IMS Core 112 sends a NOTIFY: message to wingman application 126 which then performs an UpdateBuddyDataStore( ) operation.
18. User 102a selects the SelectWingmenTab( ) in wingman application 126
19. Wingman application 126 displays a ShowWingmenListView( ) to user 102a (see FIG. 2C) (note: if there is an empty buddy list (local XML file) then the wingmen list will be empty since there are no available wingmen 104a and 106a).

At the end of this signaling, the following conditions are present: (1) the mobile user 102a has registered; (2) the mobile user 102a has subscribed to the URI of his wingmen 104a and 104b; (3) the wingman application 126 has started and displayed in sequence the login view, the setup view and the wingmen list view (see FIGS. 2A-2C).

Voice Call

Figure 2C:
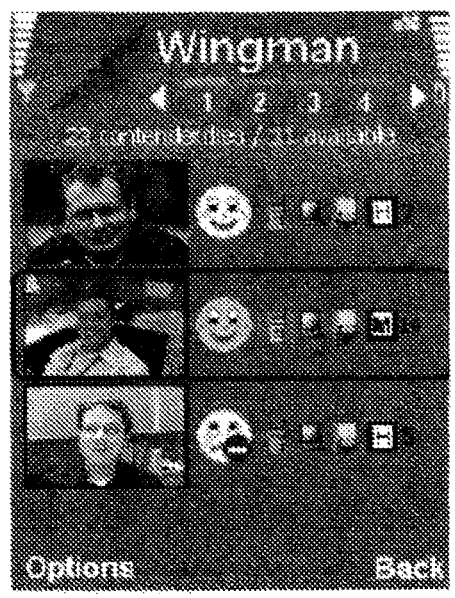
Figure 2D:
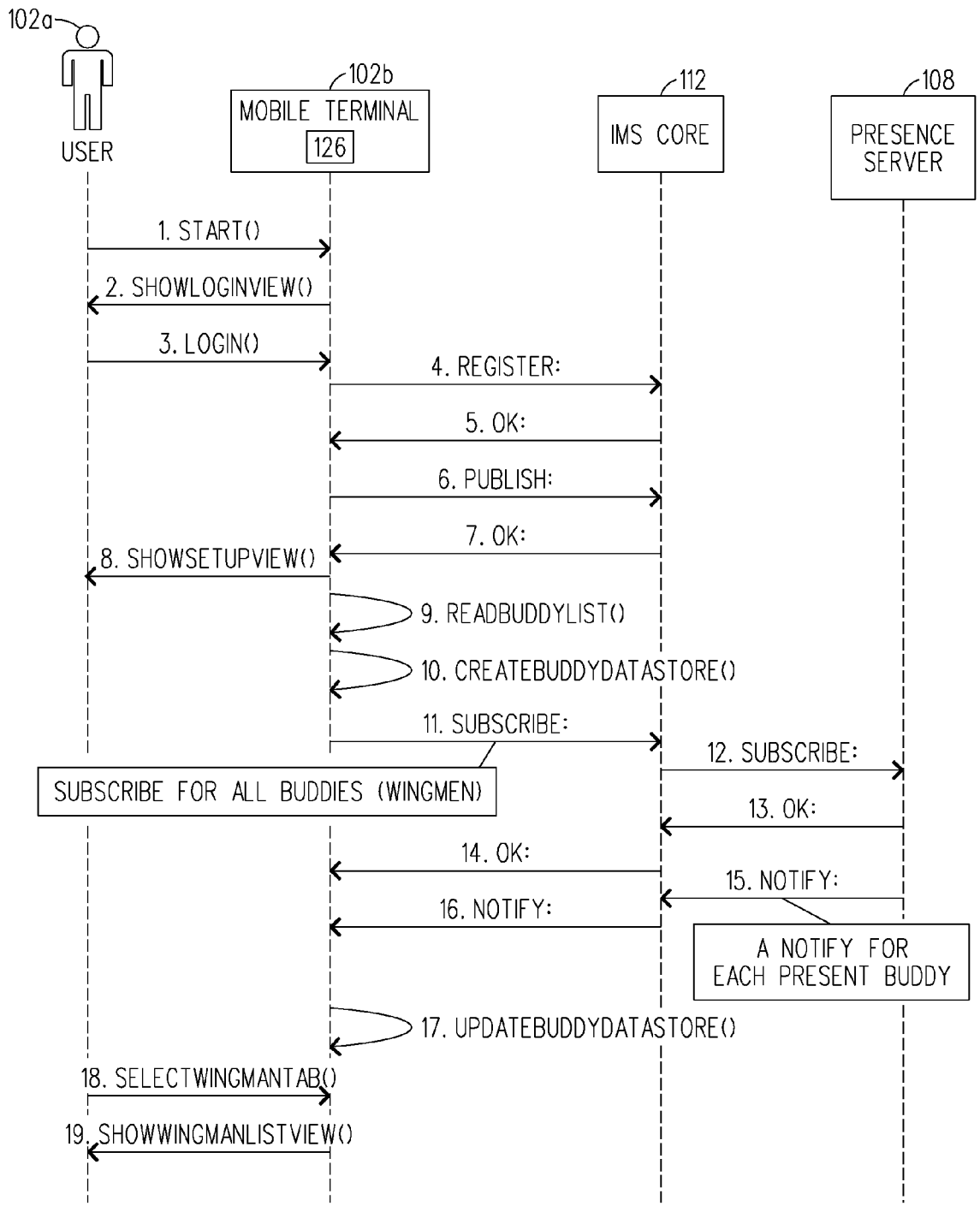

Assume the user 102a has started the wingman application 126 and is currently viewing the wingmen list (see FIG. 2C). Then, the user 102a selects a wingman 104a (for example) and a pop-up menu 302 appears in the wingman list view (see FIG. 3A). The user 102a can then select the voice chat option 304 from the pop-up menu 302 (see FIG. 3A) (note: this menu option would be available only if the selected wingman 104a was present). After selecting the voice chat option 304, a new view that shows the call progress is displayed. And, when the connection (which can be an RTP audio connection) is established, this new view would then contain a hang-up button which is used to end the voice call with the wingman 104a.

Figure 3A:
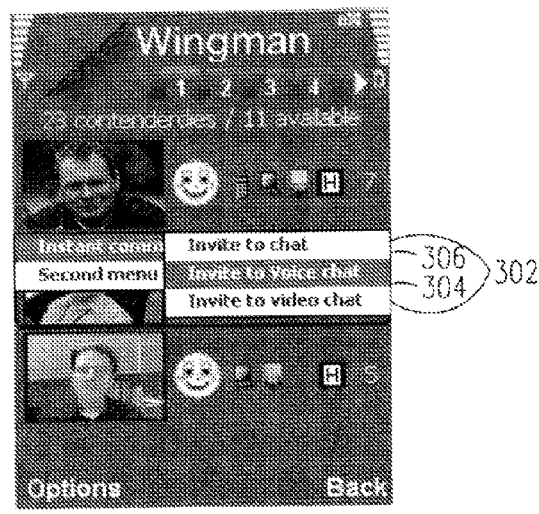
Figure 3B:
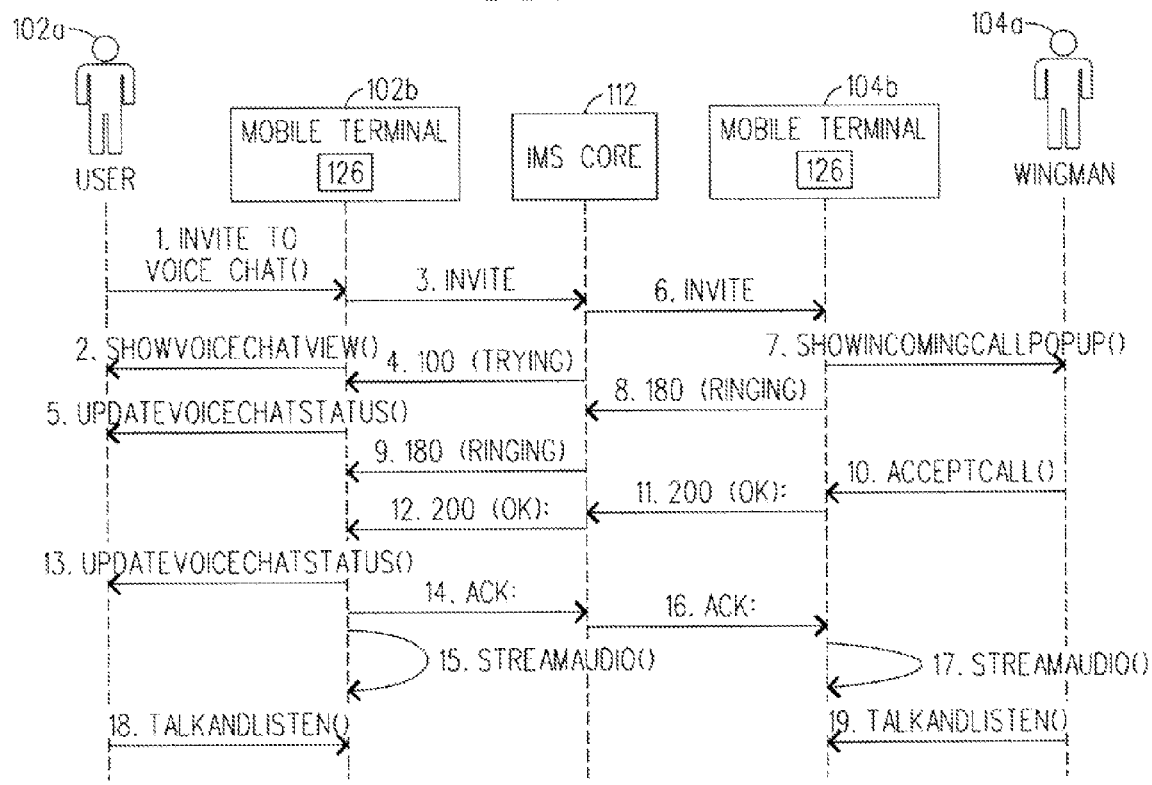

A purpose of this feature is to setup a voice call between the user 102a and one of their wingmen 104a and 106a. There are several preconditions that should be satisfied before the user 102a can enable the voice call feature which are as follows (for example): (1) the IMS core 112 (IMS proxy platform) is running; and (2) the user 102a and the selected wingman 104a (for example) have registered with the server 110. FIG. 3B is a signal flow diagram which illustrates how the user 102a can use the wingman application 126 to establish a voice call with the wingman 104a. The steps are as follows:

1. User 102a initiates the voice chat( ) feature in the wingman application 126 of their mobile terminal 102b.
2. Wingman application 126 (within mobile terminal 102b) displays a ShowVoiceChatView( ) for user 102a (see FIG. 3A).
3. Wingman application 126 (within mobile terminal 102b) sends an INVITE: message to IMS Core 112.
4. IMS Core 112 sends a 100 (Trying): message to wingman application 126 (within mobile terminal 102b).
5. Wingman application 126 (within mobile terminal 102b) displays an UpdateVoiceChatStatus( ) for user 102a.
6. IMS Core 112 sends an INVITE: message to wingman application 126 (within mobile terminal 104b).
7. Wingman application 126 (within mobile terminal 104b) displays a ShowIncomingCallPopup( ) for wingman 104a.
8. Wingman application 126 (within mobile terminal 104b) sends an 180 (Ringing): message to IMS Core 112.
9. IMS Core 112 sends an 180 (Ringing): message to wingman application 126 (within mobile terminal 102b).
10. Wingman 104b selects AcceptCall( ) in wingman application 126 (within mobile terminal 104b)(note: the wingman 104b can reject the voice call in which case no voice call would be established).
11. Wingman application 126 (within mobile terminal 104b) sends a 200 (OK): message to IMS Core 112.
12. IMS Core 112 sends a 200 (OK): message to wingman application 126 (within mobile terminal 102b).
13. Wingman application 126 (within mobile terminal 102b) displays an UpdateVoiceChatStatus( ) for user 102a.
14-15. Wingman application 126 (within mobile terminal 102b) sends an ACK: message to IMS Core 112 and begins a stream audio operation.
16-17. IMS Core sends an ACK: message to wingman application 126 (within mobile terminal 104b) which begins a stream audio operation.
18. User 102a starts to TalkAndListen( ) to wingman 104b via the wingman application 126 (within mobile terminal 102b).
19. Wingman 104b starts to TalkAndListen( ) to user 102a via the wingman application 126 (within mobile terminal 104b).

Instant Messaging (IM)

Assume the user 102a has started the wingman application 126 and is currently viewing the wingmen list (see FIG. 2C). Then, the user 102a selects a wingman 104a (for example) and a pop-up menu 302 appears in the wingman list view (see FIG. 3A). The user 102a can then select the IM chat option 306 from the pop-up menu 302 (see FIG. 3A) (note: this menu option would be available only if the selected wingman 104a was present). After selecting the IM chat option 306, a connection (e.g., MSRP connection) to the wingman 104a is setup and a new view that shows the call progress is displayed (see FIG. 4A which in this example is showing the user 102a and multiple wingmen 104a and 106a having an IM interaction).

Figure 4A:
Figure 4B:
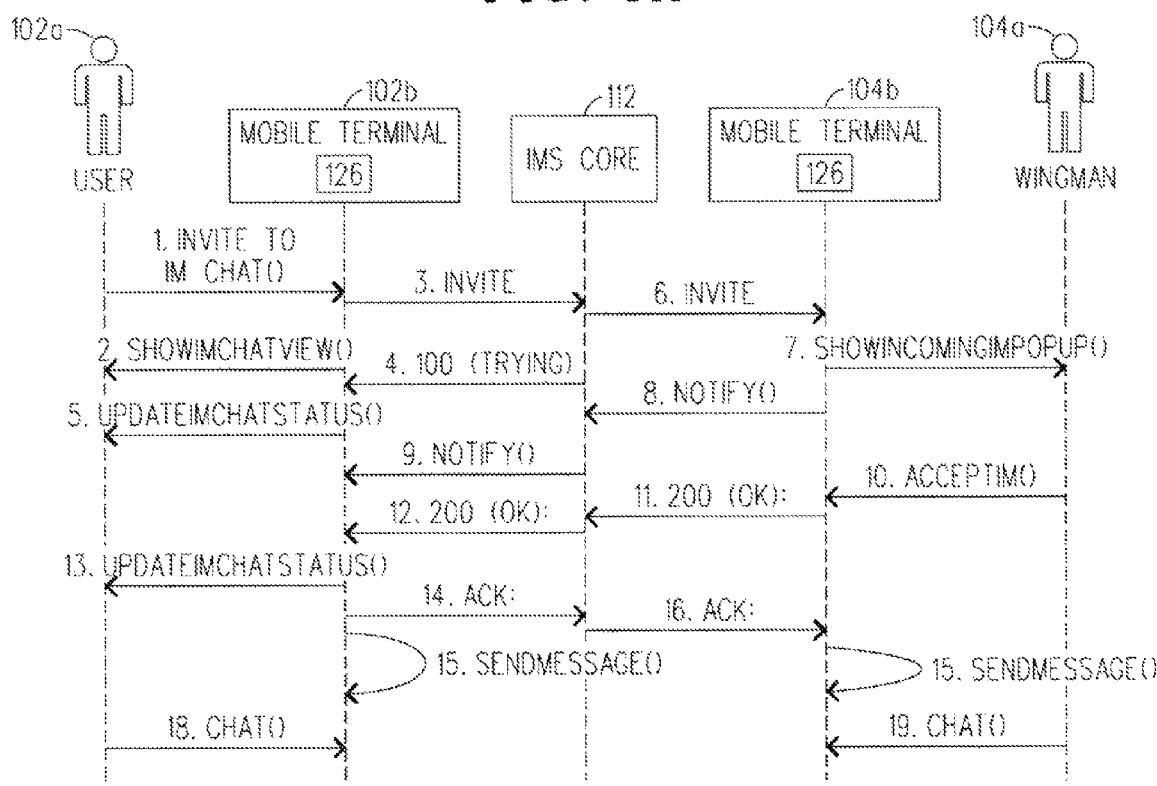

A purpose of this feature is to setup an IM connection between the user 102a and one or more of the wingmen 104a and 106a. There are several preconditions that should be satisfied before the user 102a can enable the IM feature which are as follows (for example): (1) the IMS core 112 (IMS proxy platform) is running; and (2) the user 102a and the selected wingman 104a (for example) have registered with the server 110. FIG. 4B is a signal flow diagram which illustrates how the user 102a can use the wingman application 126 to establish an IM connection with the wingman 104a. The steps are as follows:

1. User 102a initiates the IM chat( ) feature in the wingman application 126 of their mobile terminal 102b.
2. Wingman application 126 (within mobile terminal 102b) displays a ShowIMChatView( ) for user 102a (see FIG. 3A).
3. Wingman application 126 (within mobile terminal 102b) sends an INVITE: message to IMS Core 112.
4. IMS Core 112 sends a 100 (Trying): message to wingman application 126 (within mobile terminal 102b).
5. Wingman application 126 (within mobile terminal 102b) displays an UpdateIMChatStatus( ) for user 102a.
6. IMS Core 112 sends an INVITE: message to wingman application 126 (within mobile terminal 104b).
7. Wingman application 126 (within mobile terminal 104b) displays a ShowIncomingIMPopup( ) for wingman 104a.
8. Wingman application 126 (within mobile terminal 104b) sends a NOTIFY: message to IMS Core 112.

9. IMS Core 112 sends a NOTIFY: message to wingman application 126 (within mobile terminal 102b).
10. Wingman 104b selects AcceptCall( ) in wingman application 126 (within mobile terminal 104b)(note: the wingman 104b can reject the IM in which case no IM connection would be established).
11. Wingman application 126 (within mobile terminal 104b) sends a 200 (OK): message to IMS Core 112.
12. IMS Core 112 sends a 200 (OK): message to wingman application 126 (within mobile terminal 102b).
13. Wingman application 126 (within mobile terminal 102b) displays an UpdateIMChatStatus( ) for user 102a.
14-15. Wingman application 126 (within mobile terminal 102b) sends an ACK: message to IMS Core 112 and begins a SendMessage( ) operation.
16-17. IMS Core sends an ACK: message to wingman application 126 (within mobile terminal 104b) which then initiates a SendMessage( ) operation.
18. User 102a starts to Chat( ) to wingman 104b via the wingman application 126 (within mobile terminal 102b).
19. Wingman 104b starts to Chat( ) to user 102a via the wingman application 126 (within mobile terminal 104b).

Voting Queue

Figure 5A:
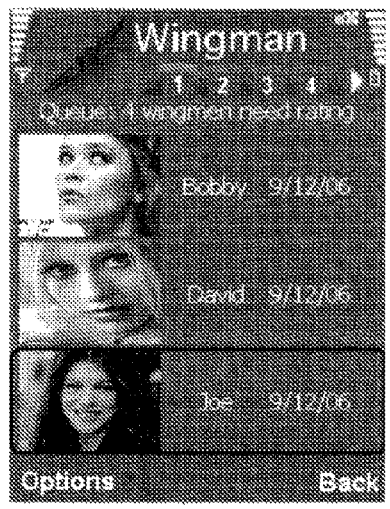

Assume the user 102a has started the wingman application 126 and selects a voting queue tab which results in the display of a voting queue image (see FIG. 5A). The voting queue image has a list of photos (referred to herein as "targets") that the wingmen 104a and 106a have taken and published which can be voted on by the user 102a. The voting queue image displays the photos (targets), the owners (wingman 104a and/or 106a) and the date the photos had been published.

Figure 5B:
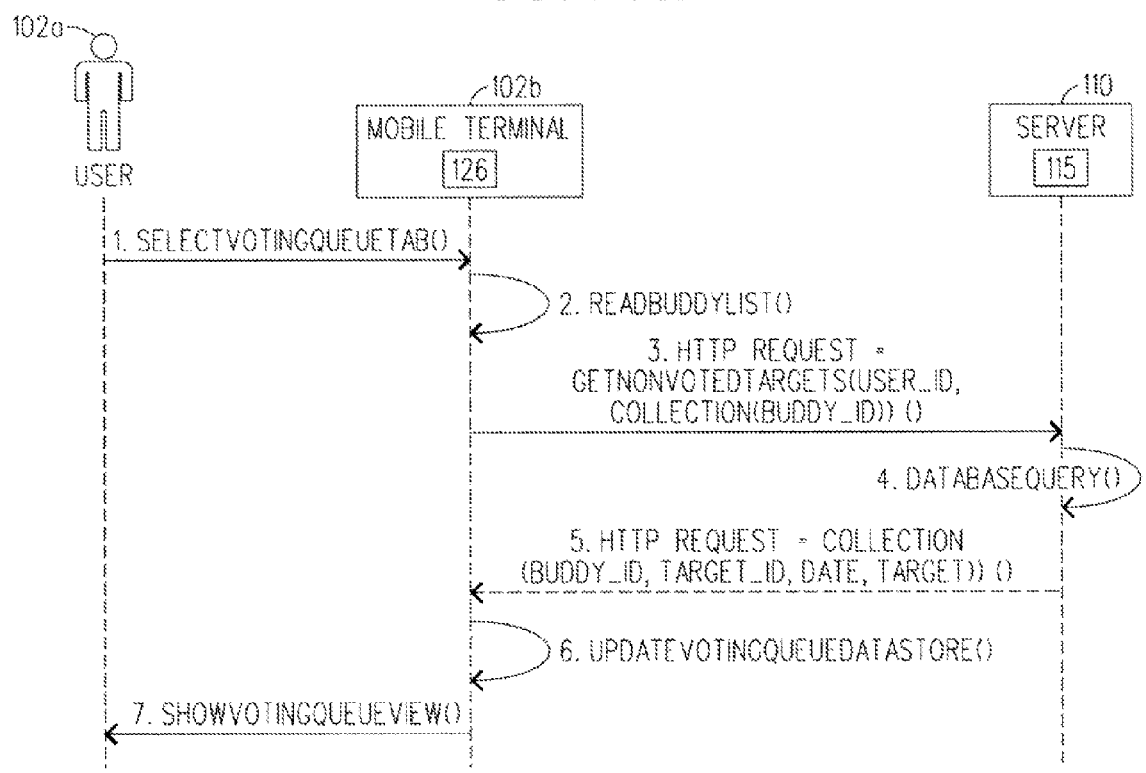

A purpose of this feature is to show a list of photos (targets) that had been published by the wingmen 104a and 106a such that the user 102a can vote on the photos (targets) (note: the "Vote" feature is discussed in detail next). There are several preconditions that should be satisfied before the user 102a can enable the voting queue feature which are as follows (for example): (1) the IMS core 112 (IMS proxy platform) is running; (2) the server 110 is running and the associated database 113 is available; and (3) the user 102a and the selected wingman 104a have been registered with the server 110. FIG. 5B is a signal flow diagram which illustrates how the user 102a can have the wingman application 126 display the voting queue image. The steps are as follows:
1. User 102a selects a SelectVotingQueueTab( ) associated with the wingman application 126 (within mobile terminal 102b).
2. Wingman application 126 (within mobile terminal 102b) obtains the ReadBuddyList( ).
3. Wingman application 126 (within mobile terminal 102b) sends a HTTP REQUEST GetNonVotedTargets(user_id, Collection(buddy_id))( ) to the wingmen servlet 115 on server 110.
4. Server 110 performs a DatabaseQuery( ) operation.
5. Server 110 sends a HTTP RESPONSE=Collection (buddy_id, date, target)( ) to wingman application 126 (within the mobile terminal 102b).
6. Wingman application 126 (within mobile terminal 102b) performs an UpdateVotingQueueDataStore( ) operation.
7. Wingman application 126 (within mobile terminal 102b) displays a ShowVotingQueueView( ) for the user 102a (note: if there are no targets available for voting then the vote queue list will be empty).

Vote

Assume the user 102a selects a photo (target) from a list of photos (targets) shown in the voting queue image (see FIG. 5A). Then, the user 102a is provided a voting image so they can rate the photo (target) from 1 to 5 (for example) (see FIG. 6A). The server 110 processes this vote and then all of the voting details associated with the photo (target) are subsequently presented to the user 102a and/or the other wingmen 104a and 106a. For example, the voting details for the particular photo (target) that can be presented include the total number of votes and the score (or the average of all the votes) by all of the users 102a, 104a and 106a.

Figure 6A:
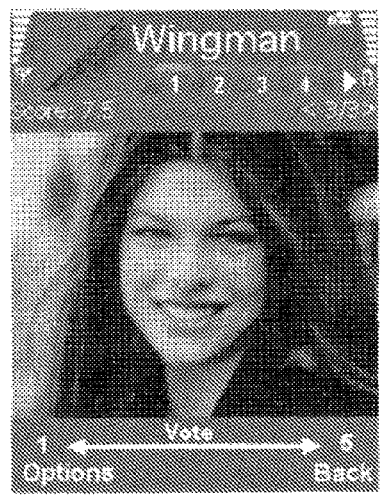
Figure 6B:
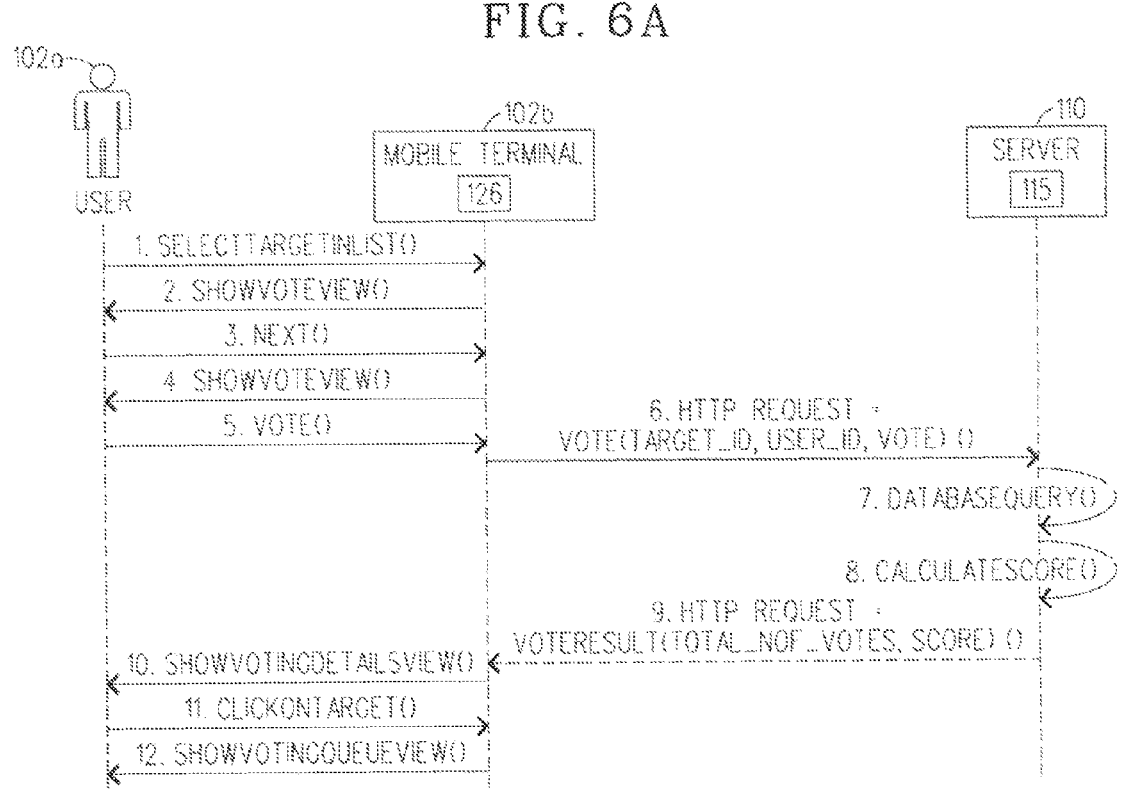

A purpose of this feature is to enable the user 102a to rate photos (targets) by voting on them and then enabling the user 102a to view the voting details associated with the rated photos (targets). There are several preconditions that should be satisfied before the user 102a can vote on the photos (targets) which are as follows (for example): (1) the IMS core 112 (IMS proxy platform) is running; (2) the server 110 is running and the associated database 113 is available; (3) the user 102a is registered with the server 110; and (4) the voting queue tab is displayed on the mobile terminal 102b. FIG. 6B is a signal flow diagram which illustrates how the user 102a can use the wingman application 126 to rate a photo (target). The steps are as follows:
1. User 102a selects the SelectTargetList( ) in wingman application 126 (within mobile terminal 102b).
2. Wingman application 126 (within mobile terminal 102b) displays a ShowVoteView( ) for user 102a (see FIG. 6A).
3. User 102a presses Next( ) for wingman application 126 (within mobile terminal 102a) (note: the user 102a can scroll through the photos (targets) to view and rate the next or previous photo (target)).
4. Wingman application 126 (within mobile terminal 102b) displays a next ShowVoteView( ) for user 102a.
5. User 102a inputs a Vote( ) to wingman application 126 (within mobile terminal 102b) to rate the photo (target) (see FIG. 6A).
6. Wingman application 126 (within mobile terminal 102b) sends a HTTP REQUEST=Vote(target_id, user_id, vote)( ) to the wingmen servlet 115 in server 110.
7-8. Server 110 performs a DatabaseQuery( ) operation and CalculateScore( ) operation.
9. Server 110 sends a HTTP RESPONSE=VoteResult (total_nof_votes, score)( ) to wingman application 126 (within mobile terminal 102b).
10. Wingman application 126 (within mobile terminal 102b) displays a ShowVotingDetailsView( ) for user 102a.
11. User 102a initiates a ClickOnTarget( ) operation in wingman application 126 (within mobile terminal 102b).
12. Wingman application 126 (within mobile terminal 102b) displays a ShowVotingQueueView( ) for user (see FIG. 5A).

Score Keeper

Figure 7A:
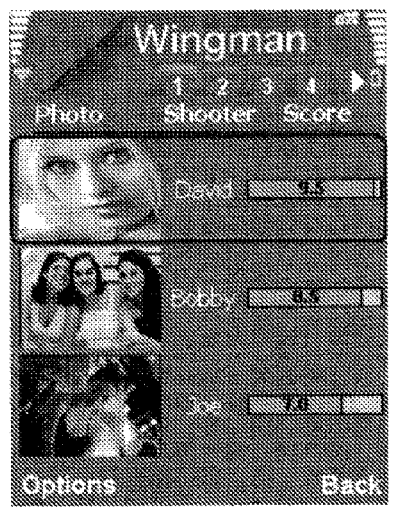

Assume the user 102a has started the wingman application 126 and selects a score keeper tab which results in the display of a score keeper view (see FIG. 7A). For example, the score keeper view list the top 10 (for example) of the highest scoring photos (targets) with the highest scoring photo (target) being presented at the top of the list. Targets of all the wingmen 104a and 106a can be presented. For each photo (target) the corresponding wingman 104a and 106a (or shooter 104a and 106a) name is listed as well as the score. In this example, the score is also presented graphically. The user 102 can scroll through the images by pressing "next" and "previous" and can select any photo (target). The selected photo (target) would then be displayed in a larger format in a new view on the same tab. The larger view would also show the number of votes and the score for that particular photo (target). At this point, the user 102*a* can click on the larger photo and return back to the score keeper view image.

Figure 7B:
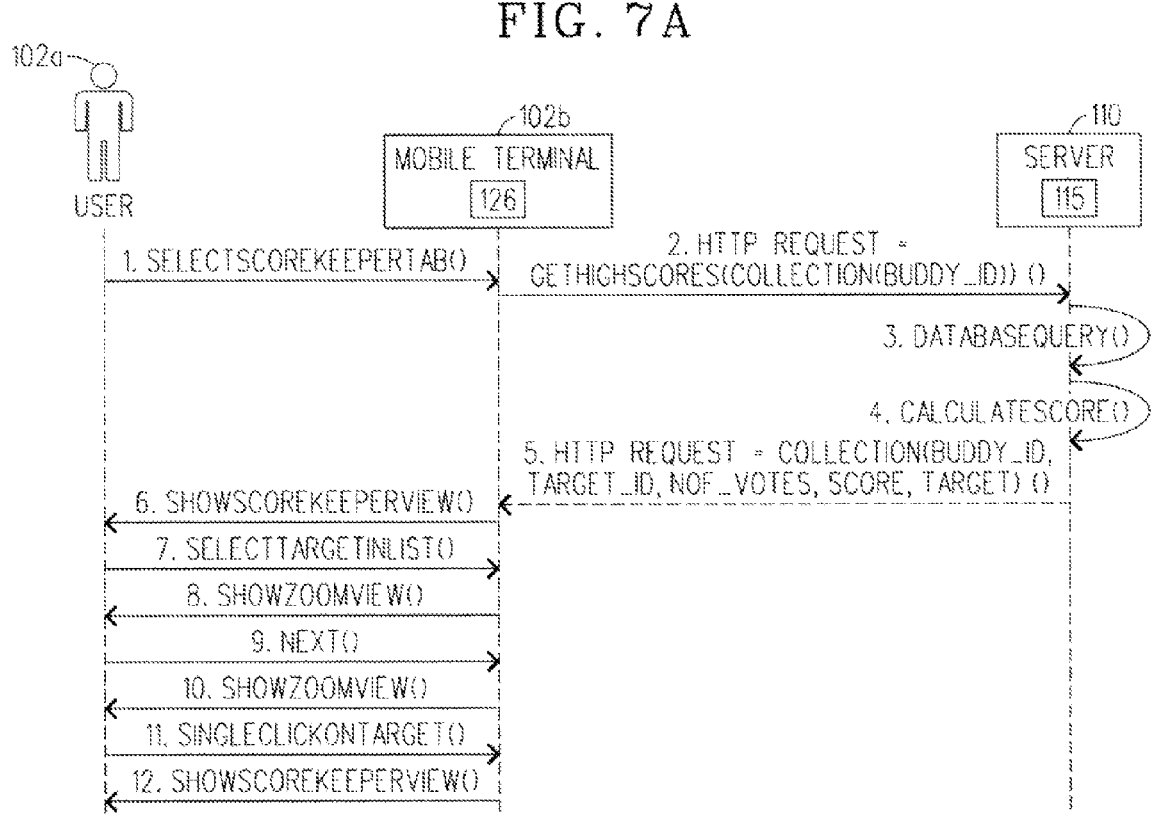

A purpose of this feature is to enable the user 102*a* to view the high scores among the photos (targets) and zoom in on a particular photo (target). There are several preconditions that should be satisfied before the user 102*a* can access the score keeper view which are as follows (for example): (1) the IMS core 112 (IMS proxy platform) is running; (2) the server 110 is running and the associated database 113 is available; and (3) the user 102*a* is registered with the server 110. FIG. 7B is a signal flow diagram which illustrates how the user 102*a* can use the wingman application 126 to access and interact with the score keeper view. The steps are as follows:

1. User 102*a* selects the SlectScoreKeeperTab( ) in wingman application 126 (within mobile terminal 102*b*).
2. Wingman application 126 (within mobile terminal 102*b*) sends a HTTP REQUEST GetHighScores(Collection(buddy_id))( ) to wingmen servlet 115 in server 110.
3-4. Server 110 performs a DatabaseQuery( ) operation and CalculateHighScores( ) operation.
5. Server 110 sends a HTTP RESPONSE=Collection(buddy_id, target_id, nof_votes, score, target)( ) to wingman application 126 (within mobile terminal 102*b*).
6. Wingman application 126 (within mobile terminal 102*b*) displays a ShowScoreKeeperView( ) for user 102*a* (see FIG. 7A)(note: if no photos (targets) are currently available then the score keeper list will be empty).
7. User 102*a* selects a SelectTargetInList( ) in wingman application 126 (within mobile terminal 102*b*).
8. Wingman application 126 (within mobile terminal 102*b*) displays a ShowZoomView( ) for user 102*a*.
9. User 102*a* presses Next( ) in wingman application 126 (within mobile terminal 102*b*) (note: the user 102*a* can press "next" and "previous" to scroll through the high score photos (targets)).
10. Wingman application 126 (within mobile terminal 102*b*) displays a next ShowZoomView( ) for user 102*a*.
11. User 102*a* initiates a SingleClickOnTarget( ) operation in wingman application 126 (within mobile terminal 102*b*).
12. Wingman application 126 (within mobile terminal 102*b*) displays a ShowScoreKeeperView( ) for user 102*a* (see FIG. 7A).

Social Gravity

Figure 8A:
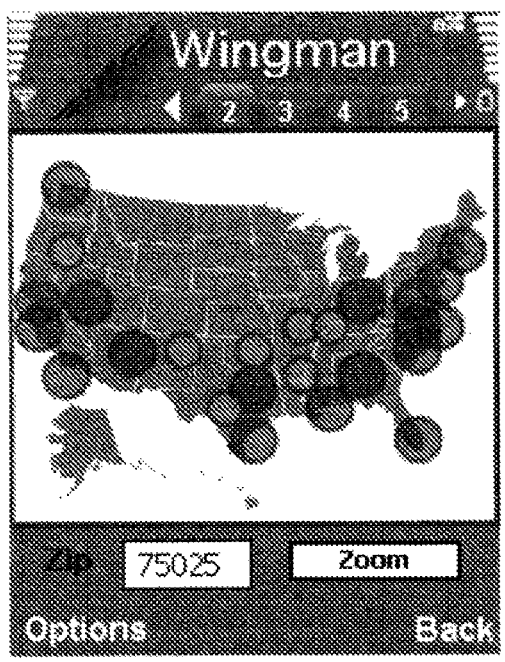
Figure 8B:
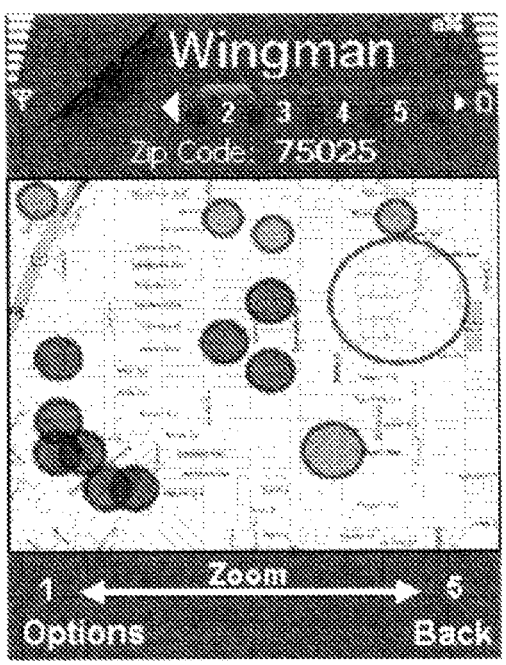

Assume the user 102*a* has started the wingman application 126 and selects a social gravity tab which results in the display of a social gravity view (see FIG. 8A). The user 102*a* can then click on a particular area of the map in the social gravity view to see a detailed map of a pre-defined area (see FIG. 8B). If desired, the user 102*a* can click on the detailed map and be returned to the large map. The large map and the detail map both indicate the location that the posted content (photos) was taken to provide visibility to where the wingmen 104*b* and 106*b* are located when taking the photos while for example visiting the "hot spots" while out on the town.

New Photo

Assume the user 102*a* has used a camera 902 within their mobile terminal 102*b* to take a new picture. The new photo would be stored in a pre-defined folder that is monitored by the wingman application 126. When a new photo (target) is placed in the pre-defined folder, then the wingman application 126 sends this new photo (target) to the wingmen servlet 115 in the server 110 where it gets stored in the database 113. Then, the wingman application 126 also publishes that a new photo (target) is available. The details of the new photo (target) would not need to be included in this publish because the IMS core 112 and the presence server 108 take care of distributing all of this information to the wingmen 104*a* and 106*a* by sending them a new photo notification. If one of the wingmen 104*a* and 106*a* is not subscribed at that moment, then they would receive the new photo notification after he/she subscribes and registers with the server 110. When, the wingmen 104*a* and 106*a* accepts the notification, then their wingman application 126 (within mobile terminal 104*a* and 106*b*) jumps to the voting queue view (see FIG. 5A). Upon the opening of that view the photo (target) and photo details are retrieved from the server 110.

Figure 9:
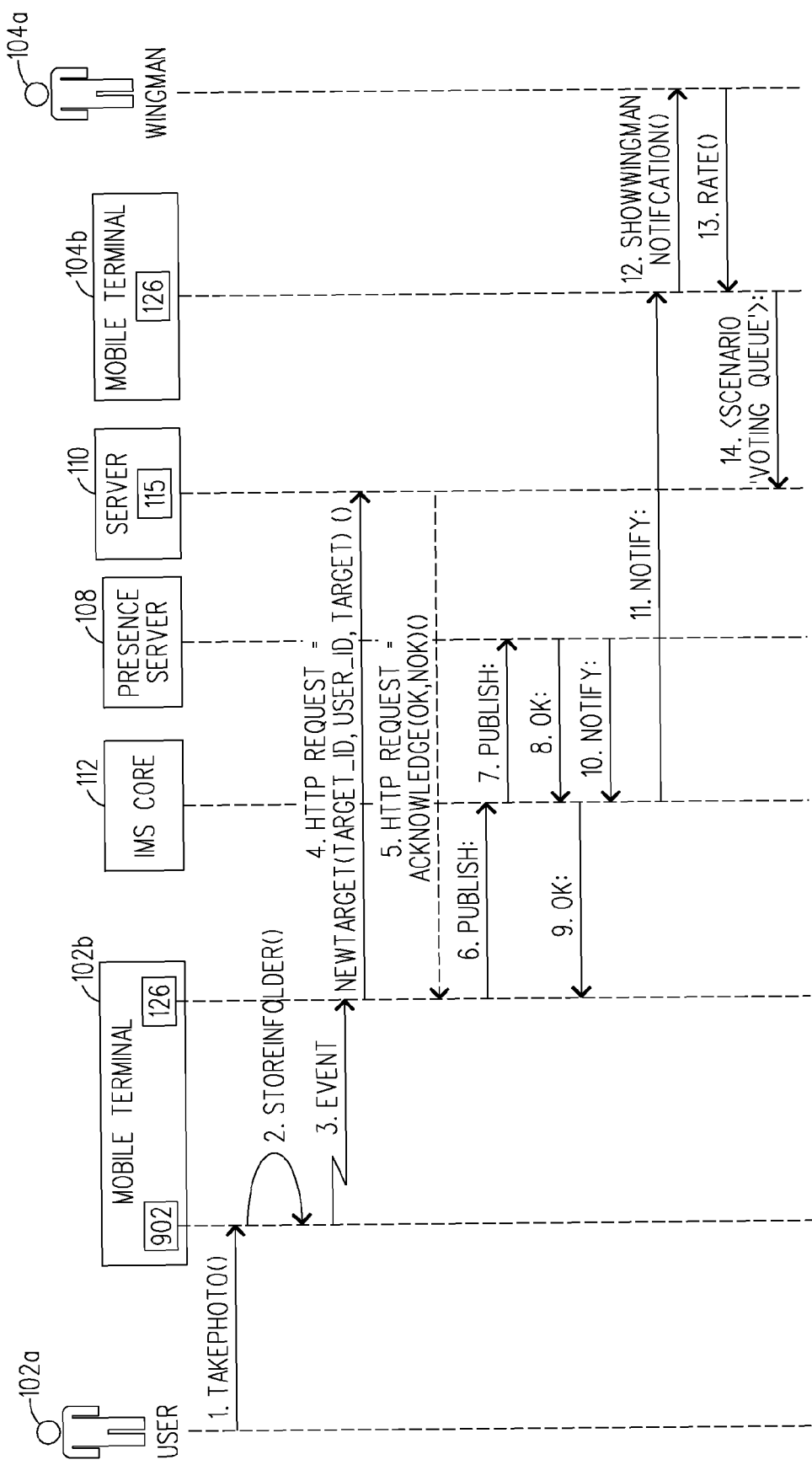
Figure 10:
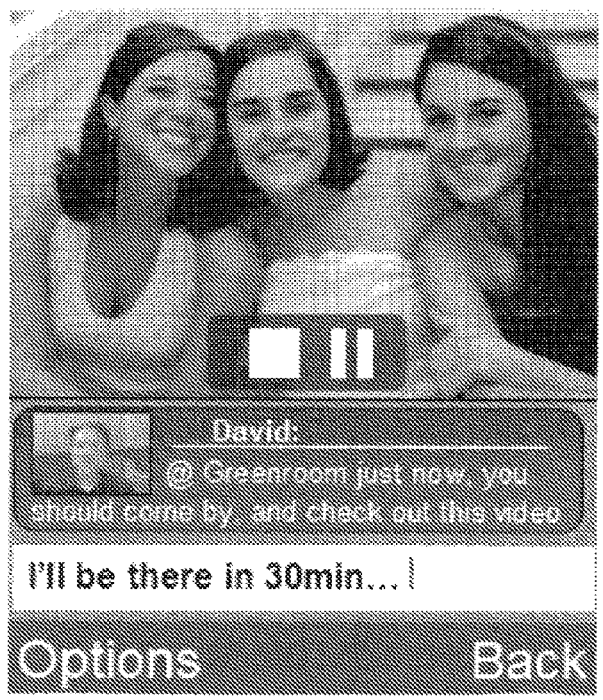
Figures 11A, 11B, 11C:
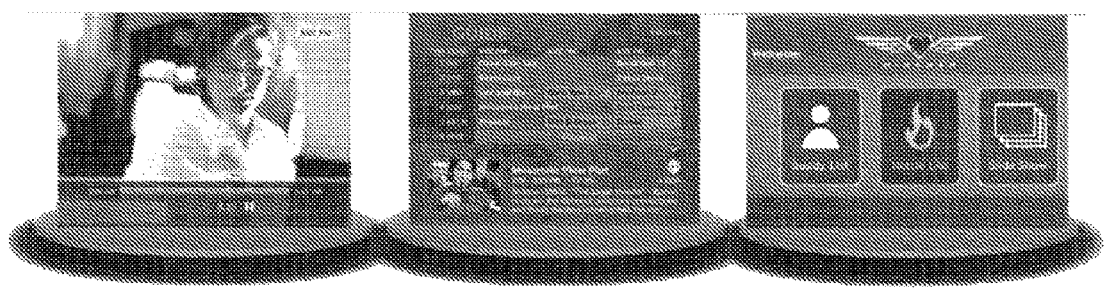

A purpose of this feature is to enable the user 102*a* to take (shoot) a new photo which would be automatically uploaded to the server 110 and then automatically distributed to the wingmen 104*a* and 106*a* so they can view and vote (if desired) on the new photo (target). There are several preconditions that should be taken before the user 102*a* can take a new photo which are as follows (for example): (1) the IMS core 112 (IMS proxy platform) is running; (2) the server 110 is running and the associated database 113 is available; (3) the wingmen 104*a* and 106*a* are subscribed to the user 102*a*; and (4) the mobile terminal 102*b* has an on-board digital camera 902. FIG. 9 is a signal flow diagram which illustrates how the user 102*a* can take a new photo (target) which is then automatically published to their wingmen 104*a* and 106*a*. The steps are as follows:

1. User 102*a* takes photo( ) using Camera 902 (within mobile terminal 102*b*).
2. Camera 902 (within mobile terminal 102*b*) performs a StoreinFolder( ) operation to store the new photo.
3. Camera 902 (within mobile terminal 102*b*) informs wingman application 126 (within mobile terminal 102*b*) about the taking of the new photo (note: this operation is event based as such the user 102*a* does not need to select the new photo and upload the new photo to the wingman application 126).
4. Wingman application 126 (within mobile terminal 102*b*) sends a HTTP REQUEST=NewTarget(target_id,user_id,target)( ) to wingmen servlet 115 in server 110.
5. Server 110 sends a HTTP RESPONSE=Acknowledge (OK,NOK)( ) to wingman application 126 (within mobile terminal 102*b*).
6. Wingman application 126 (within mobile terminal 102*b*) sends a PUBLISH: message to IMS Core 112.
7. IMS Core 112 sends a PUBLISH: message to presence server 108.
8. Presence server 108 sends an OK: message to IMS Core 112.
9. IMS Core 112 sends an OK: message to wingman application 126 (within mobile terminal 102*b*).
10. Presence server 108 sends a NOTIFY: message to IMS Core 112.
11. IMS Core 112 sends a NOTIFY: message to wingman application 126 (within mobile terminal 104*b*)(note: only the wingman 104*a* (for example) that have subscribed to receive this notification will be notified when there is a new photo taken by user 102*a*).
12. Wingman application 126 (within mobile terminal 104*b*) displays a ShowWingmanNotification( ) to wingman 104*a*.
13. Wingman 104*a* votes on the photo which results in a Rate( ) being sent to wingman application 126 (within mobile terminal 104*b*).

14. Wingman application 126 (within mobile terminal 104b) sends a <Scenario 'Voting Queue'> message indicating the rating to wingmen servlet 115 in server 110. Note: Wingmen that are currently not online (not subscribed) do not get notified but a publish with a short-term validity could be used. This way, the on-line wingmen would get notified immediately while the off-line wingmen can select the voting queue tab to see the new photos after they have started the wingman application 126.

Video Sharing and Chat

Assume the user 102a has started the wingman application 126 and used their mobile terminal 102a to shoot a video which can be shared with their wingmen 104a and 106a. The video is forwarded to the IMS core 112 and then the server 110 so it can be shared with the wingmen 104a and 106a. In particular, the server 110 sends notifications to the wingmen 104a and 106a so if they want to they can push/pull these videos (download) or watch them directly using a streaming mechanism such as RTP, RTCP and RTSP (via a pvServer) (note: the wingmen 104a and 106a could also vote on the video in the same manner as they would a photo). If the wingmen 104a and 106a are connected simultaneously, the user 102a and the wingmen 104a and 106a could if desired chat while watching the videos (see FIG. 10). In addition, if the videos come from the same physical location (for instance a restaurant, a bar, a party . . . ) then they could be pooled together to compile multiple "video snapshots" of specific locations (note: this can be part of the social gravity feature).

IP Video Extension

User 102a is also able to access their wingman application from an IP video context (e.g., IPTV context) when they are home watching television 124 or using their computer (see IP video server 114 and television 124 in FIG. 1). For instance, when a user 102a is watching their television 124 they could receive pop-up notifications on their television 124 when their wingmen 104a and 106a are submitting new photos to the server 110 (see FIG. 11A). The user 102a is able to access their wingman application via the electronic program guide to see a list of their wingmen 104a and 106a, as well as view and rate the new photos (see FIGS. 11B-11C).

Application Shutdown

Figure 12:
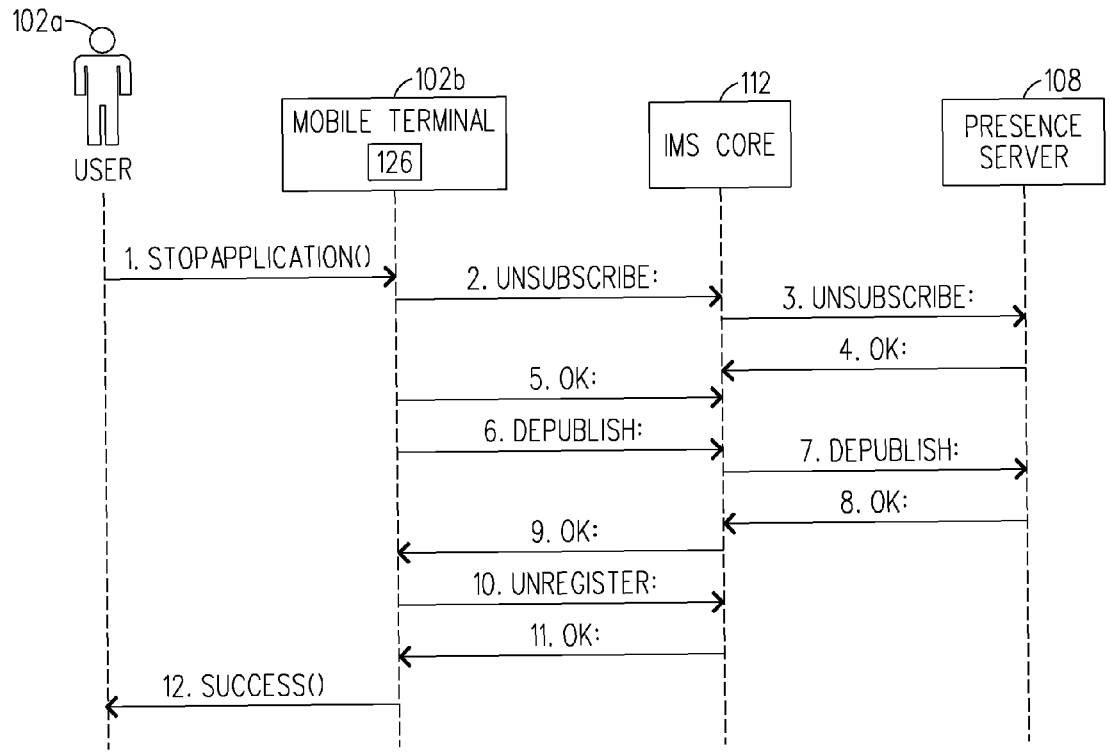

Assume the user 102a wants to log-out and stop the wingman application 126 within their mobile terminal 102b. The logging-out process involves unsubscribing to the wingmen 104a and 106a, de-publishing and un-registering yourself. There are several preconditions before the user 102a can log-out and stop the wingman application 126 within their mobile terminal 102b which are as follows (for example): (1) the IMS core 112 (IMS proxy platform) is running; (2) the mobile terminal 102b has an IP connection to the IMS core 112; and (3) the user 102a is registered and the wingman application 126 is running on their mobile terminal 102b. FIG. 12 is a signal flow diagram which illustrates how the user 102a can shutdown their wingman application 126. The steps are as follows:

1. User 102a sends a StopApplication( ) instruction to wingman application 126 (within mobile terminal 102b).
2. Wingman application 126 (within mobile terminal 102b) sends an unSUBSCRIBE: message to IMS Core 112.
3. IMS Core 112 sends an unSUBSCRIBE: message to presence server 108.
4. Presence server 108 sends an OK: message to IMS Core 112.
5. IMS Core 112 sends an OK: message to wingman application 126 (within mobile terminal 102b).
6. Wingman application 126 (within mobile terminal 102b) sends a dePUBLISH: message to IMS Core 112.
7. IMS Core 112 sends a dePUBLISH: message to presence server 108.
8. Presence server 108 sends an OK: message to IMS Core 112.
9. IMS Core 112 sends an OK: message to wingman application 126 (within mobile terminal 102b).
10. Wingman application 126 (within mobile terminal 102b) sends an unREGISTER: message to IMS Core 112.
11. IMS Core 112 sends an OK: message to wingman application 126 (within mobile terminal 102b).
12. Wingman application 126 (within mobile terminal 102b) displays a Success( ) message for user 102a.

As can be appreciated, to implement these various features the user 102a will need to interface with a GUI located on their mobile terminal 102b. The GUI which is associated with the wingman application 126 can display several different tabs each of which enables the user 102a to access one or more views. The following table gives an overview of an exemplary GUI.

TABLE 1

| Tab | View(s) |
|---|---|
| 1. My Profile (slide-ware) (see FIGS. 2A-2B) | Login Setup |
| 2. Wingmen (see FIG. 2C, 3A and 4A) | Main wingmen list (see FIG. 2C) Wingman voice chat status Wingman IM chat status Wingmen Buddy list (multi-level) Target List Target Zoom |
| 3. Voting Queue (see FIG. 5A, 6A) | Target list Rate a target Rating details |
| 4. Score Keeper (see FIG. 7A) | Score keeper Zoom |
| 5. Crush List (see FIGS. 17A and 17B) | Crush list Hook up status Zoom |
| 6. Social Gravity (see FIGS. 8A and 8B) | Social gravity Zoom |

In addition to these tabs and views, the GUI can display various notification pop-ups which can appear in various views. For example, the following events and actions can result in the display of a notification pop-up on the GUI of the mobile terminal 102b:

TABLE 2

| Event | Pop-up and action(s) |
|---|---|
| 1. New target available | Wingman notification: Rate → show Target list view on Voting queue tab Cancel → remain in current view |
| 2. Hook-up request | Wingman request: Hook-up → show Target Zoom view on Wingmen tab Cancel → remain in current view In Target Zoom view: Hook-up → perform hook-up functionality, return to previous view. Cancel → return to previous view. |

TABLE 2-continued

| Event | Pop-up and action(s) |
| --- | --- |
| 3. Hooked-up | Wingman confirmation:<br>View → show Target Zoom view on Wingmen tab<br>Cancel → remain in current view |

The following description is provided to help explain how the user 102a can navigate between the different views for each tab.

My Profile Tab

Figure 13:
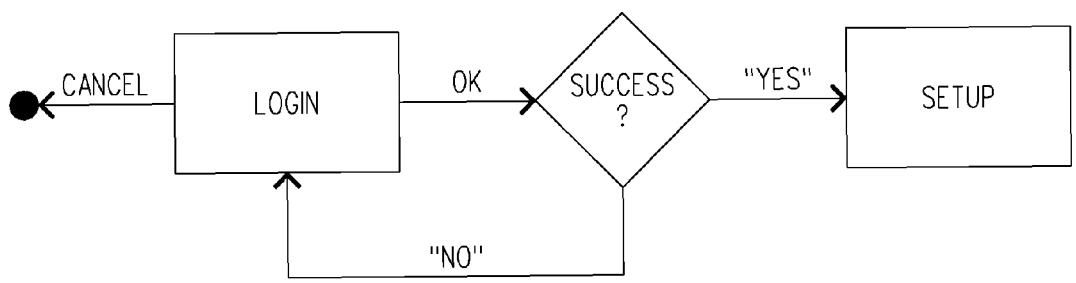

The My Profile Tab contains the login view and the setup view (see FIGS. 2A-2B). The login view is fully functional and allows the user 102a (for example) to login by providing their username and password. The wingman application 126 then constructs a SIP address (for example) based on the username and tries to register the user 102a with the server 110. Upon a successful registration, the setup view is displayed (note: the user 102a may also specify preferences in a profile if desired to personalize the setup view). In this example, the user 102a would use the slide-ware to interact with the setup view. FIG. 13 is a block diagram that illustrates the navigation between the different views (shown as blocks) that are associated with the My Profile Tab.

Wingmen Tab

Figure 14:
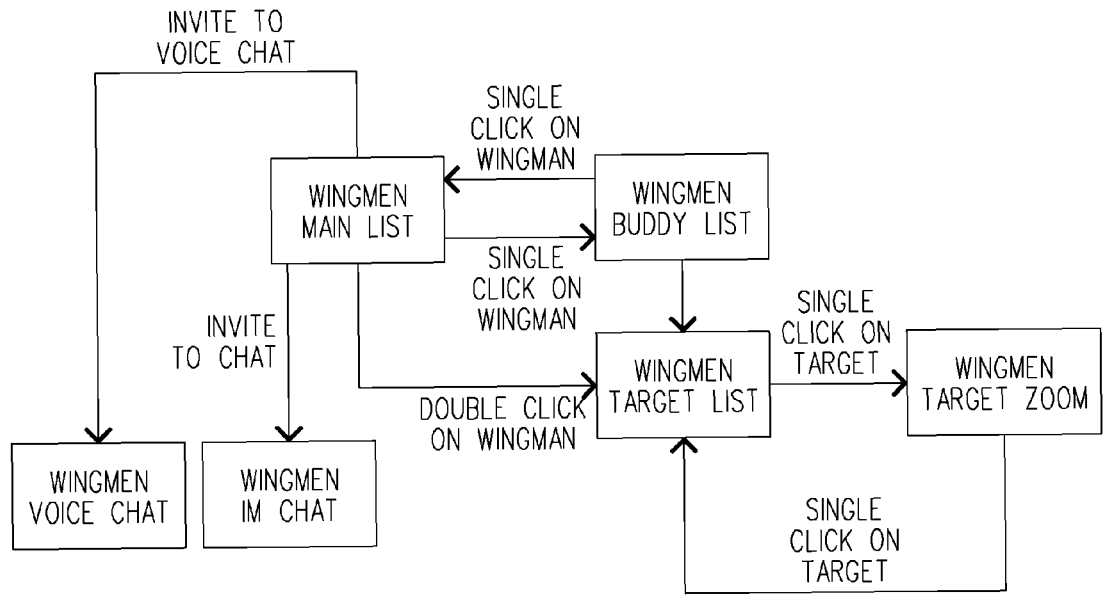

The main view of the Wingmen tab is the Wingmen List view (see FIG. 2C). The Wingmen List view shows all the wingmen 104a and 106a associated with the current user 102a including, for example, their photos, online status, reachability and number of connections (wingmen, buddies). FIG. 14 is a block diagram that illustrates the navigation between the different views (shown as blocks) that are associated with the Wingmen Tab.

Voting Queue Tab

Figure 15:
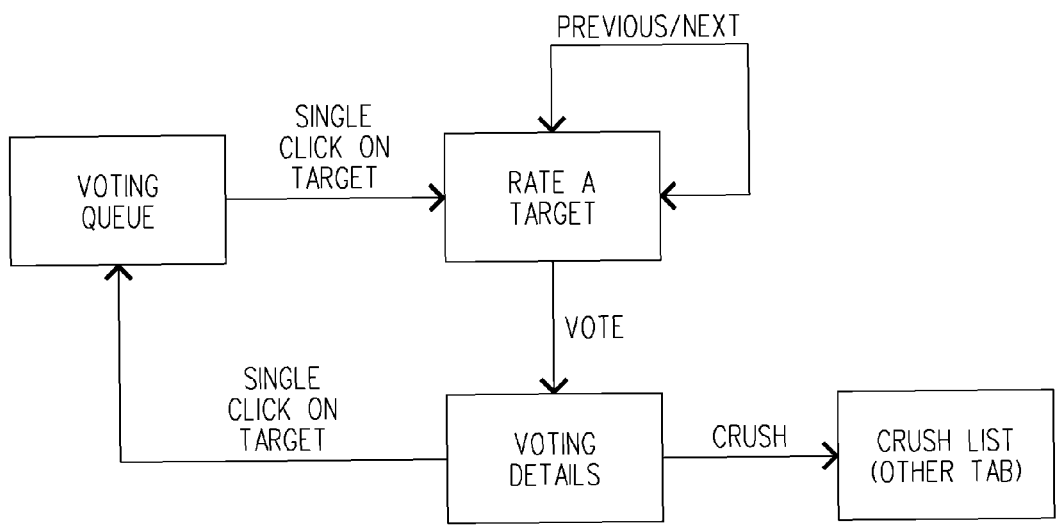

The main view of the Voting Queue Tab is the Voting Queue List view (see FIG. 5A). In this example, the Voting Queue List view shows all the photos (targets) that still need to be voted on by the user 102a and wingmen 104 and 106a, including the number of photos (targets) in the queue, the wingman reference and the date. If desired, a Rate a Target view can be displayed which shows a bigger picture of the target and offers functionality to vote on the target from 1 (minimum) to 5 (maximum) (see FIG. 6A). After voting, the same picture can be displayed and, in addition, the total number of votes on the photo (target) and the average rating can also be displayed. Moreover, when a user 102a rates a photo then they could be prompted with a crush icon which when pressed can enable them to notify the shooter 104a (wingman 104a that took the photo) that they are interested in meeting the target. The shooter 104a is then notified of this event, by the server 110, and the shooter 104a is then able to help connect or establish a meeting between the user 102a and the target. FIG. 15 is a block diagram that illustrates the navigation between the different views (shown as blocks) that are associated with the Voting Queue Tab.

Score Keeper Tab

The main view of the Score Keeper Tab is the Score Keeper view (see FIG. 7A). In this example, the Score Keeper view shows the highest scoring targets of all the users 102a, 104a and 106a, sorted in a way that the "best" scoring target is at the top of the list. By selecting a target, a bigger picture of the target would be displayed. FIG. 16 is a block diagram that illustrates the navigation between the different views (shown as blocks) that are associated with the Score Keeper Tab.

Crush List Tab

Figure 17C:
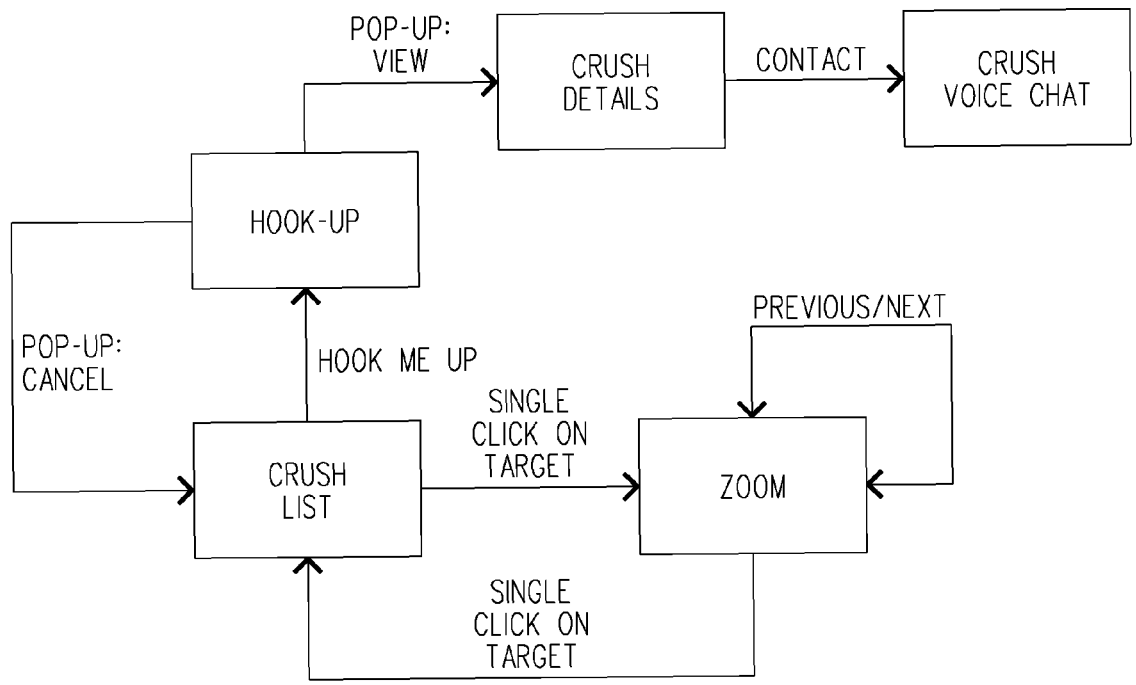

The main view of the Crush List Tab is the Crush List view (see FIG. 17A) (note: FIG. 17B shows the image the user 102a can interact with to set a crush on a particular target). The Crush List view shows all the targets (in the photos) that the user 102a (for example) has a "crush-on" (i.e., they would like to call or meet) including the number of targets in the queue, the wingman reference and the date. FIG. 17C is a block diagram that illustrates the navigation between the different views (shown as blocks) that are associated with the Crush List Tab.

Social Gravity Tab

Figure 18:
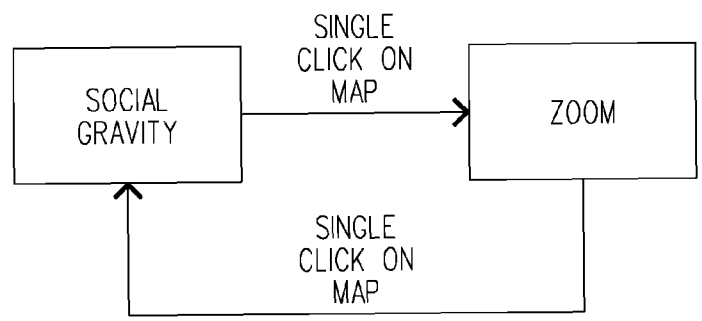

The main view of the Social Gravity Tab is the Social Gravity view (see FIG. 8A). The Social Gravity view shows a high level United State's map (for example) with icons to represent social activity. In this example, the user 102a (for example) can click on the general map such that the more detailed map is displayed (see FIG. 8B). The Social Gravity view could also be enhanced to include location services. For example, when the user 102a (or other wingmen 104a or 106a) takes a photo the wingman server 110 stores the photo as well as the location information as to where the photo was taken. As photos are rated by the users 102a, 104a and 106a, the server 110 can take the highest scores associated with various photos taken at a given location and plot it on the Social Gravity map as a "hotspot". As a result, when a wingman 104a (for example) accesses the Social Gravity tab that wingman will be able to view the hotspots of a selected area as indicated by their wingmen rated photos. FIG. 18 is a block diagram that illustrates the navigation between the different views (shown as blocks) that are associated with the Social Gravity Tab.

Figure 19:
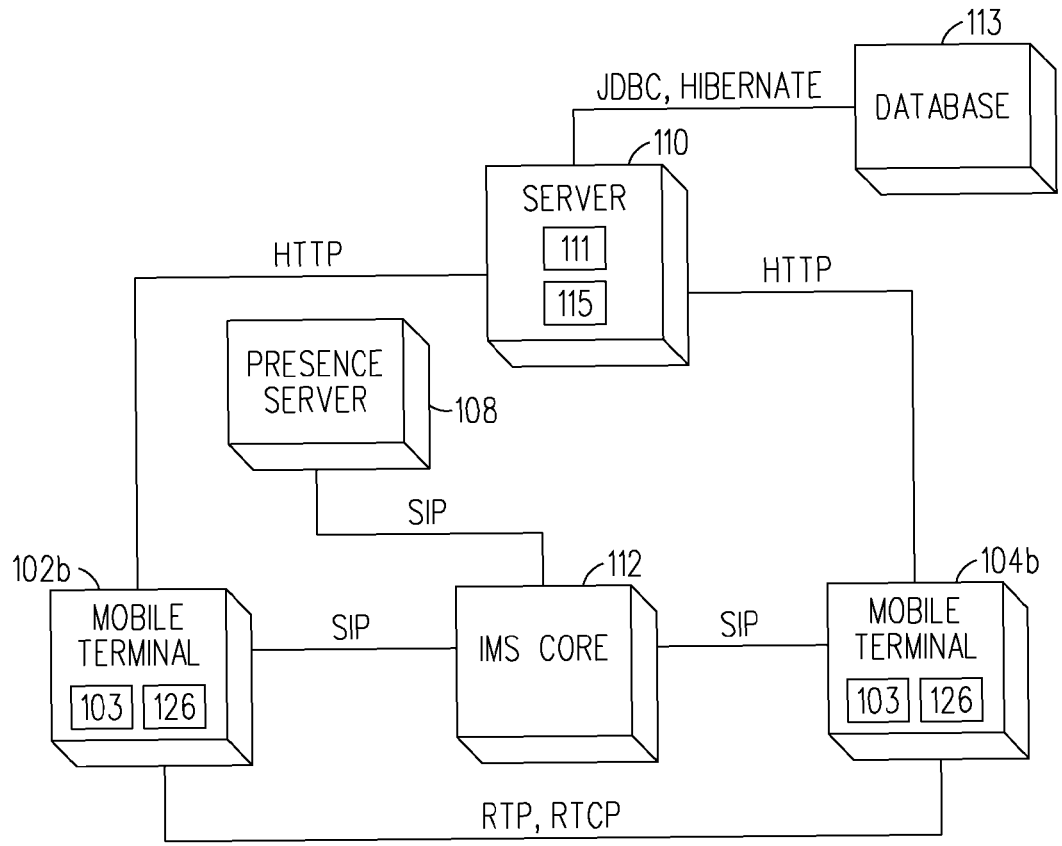
FIGS. 19-21 are diagrams which are used to help explain the software that can be used to enable the system to provide a social networking experience to the users of the mobile terminals in accordance with the present invention.

Referring to FIG. 19, there is a block diagram illustrating a static software model which represents the various sub-systems that are associated with an exemplary wingman system 100 in accordance with the present invention (see FIG. 1). The static software model shows the software structure and the dependencies between the various sub-systems. Each identified subsystem 102b, 104b, 108, 110, 112 and 113 contributes to the aforementioned behavior and features of the system 100 (see TABLE 3).

TABLE 3

| Subsystem | Responsibility |
| --- | --- |
| Wingman Application 126 (within mobile terminal) | This subsystem implements the user interface and client-side of the Wingman System 100. Responsibilities relate to the aforementioned look, feel and features. |
| Wingman Servlet (within server 110) | This subsystem implements the server-side of the Wingman System 100. Responsibilities relate to the persistent storage and enabling the aforementioned features. |
| IMS Core 112 | Provides all CSCF and other IMS core functionality. |
| Presence Server 108 | Provides Presence support. |
| Database 113 | Persistent storage of targets and target details. |

Figure 20A:
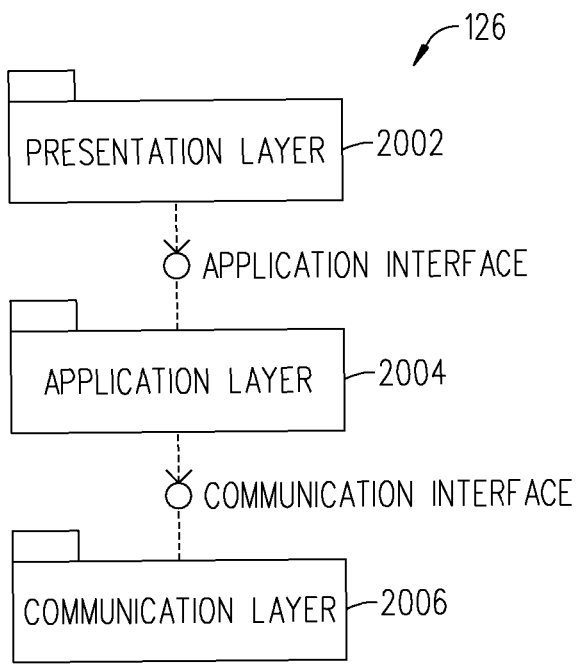
Figure 20B:
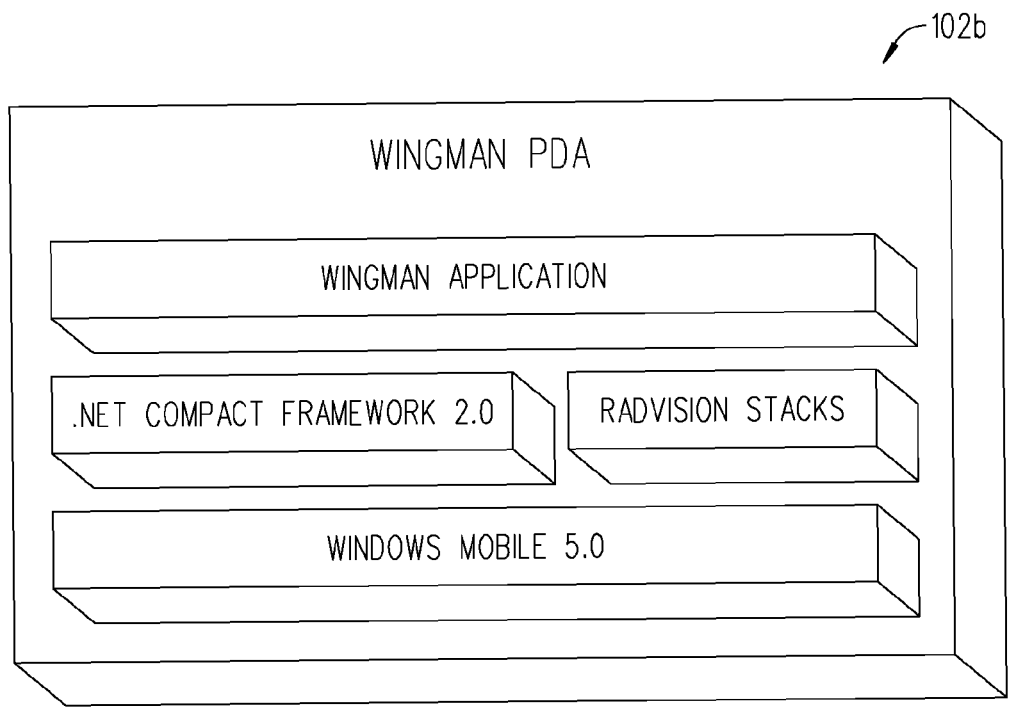

Referring to FIGS. 20A and 20B, there are two block diagrams which illustrate an exemplary architecture of the wingman application 126 associated with the mobile terminals 102b, 104b and 106b in accordance with the present invention. As shown in FIG. 20A, the wingman application 126 has a presentation layer 2002, an application layer 2004 and a communication layer 2006 (note: the wingman application 126 is multi-threaded so it can simultaneously handle multiple tasks). The presentation layer 2002 contains the screens, frames and other controls. The application layer 2004 contains the business logic of the application. And, the communication layer 2006 contains three communication stacks: (1) the RadVision SIP stack for session initiation; (2) the RadVision RTC stacks for streaming audio (RTP) and; and (3) an HTTP stack for communicating with the Wingman Servlet 115 in the server 110 (see FIG. 20B which shows the exemplary software layers in the mobile terminal 102b). The wingman application 126 has multiple actors (see TABLE 4).

TABLE 4

| Actor | Purpose |
|---|---|
| user 102a | The user 102a controls the wingman application 126. The user 102a also initiates some of the features of the system 100. |
| IMS Core 112 | The IMS Core 112 responds to calls of the Wingman Application 126. Furthermore, it forwards calls to the wingman application 126 that should be handled properly. |
| Camera 902 | Provides photos. |
| mobile terminal 102b | Provides access to the network operator. |

Figure 21:
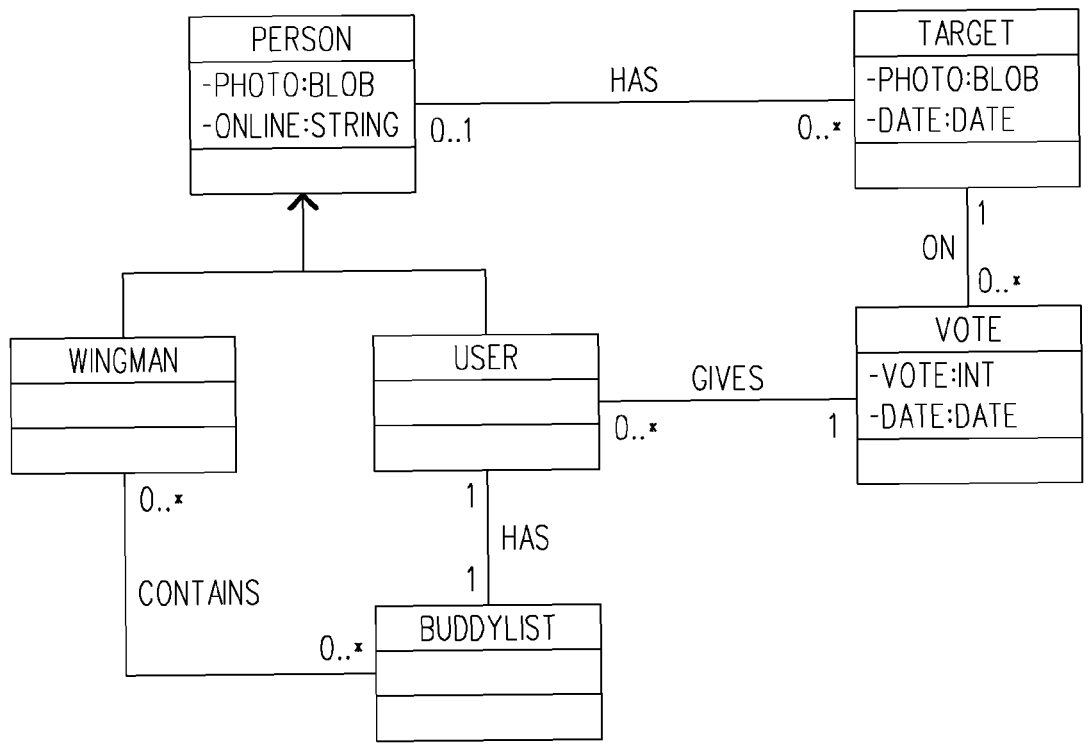

Referring to FIG. 21, there is a block diagram which illustrates an exemplary data architecture of the wingman system 100 in accordance with the present invention. This exemplary high-level class diagram is valid for the wingman application 126 (e.g., associated with the mobile terminal 102b) and the wingman servlet 115 (associated with the server 110) (note: the wingman servlet 115 is multi-threaded so it can simultaneously handle multiple tasks). The wingman servlet 115 has the several actors (see TABLE 5).

TABLE 5

| Actor | Purpose |
|---|---|
| Wingman Application 126 | The user 102a sends requests and receives responses from the Wingman Servlet 115. The user 102a initiates some of the features of the system 100. |
| Database 113 | Wingman Servlet uses the database 113 for persistent storage of targets and target details. |

In addition, the wingman servlet 115 interfaces with the database 113 for the storage of the photos/targets and the votes. The wingman servlet 115 would typically support the following actions: (1) adding a photo/target; (2) adding a vote for a photo/target; (3) associating the photos/targets with a specified voter (wingman or user); and (4) calculating high scores for targets from a specified set of wingmen. A possible table structure which can be used by the wingman servlet 115 is presented in TABLE 6.

TABLE 6

| TABLE: Targets | | | | TABLE: Votes | | |
|---|---|---|---|---|---|---|
| target_id | String | PK | | target_id | String | PK |
| shooter_id | String | PK | | shooter_id | String | PK |
| date | Date | | | voter_id | String | PK |
| photo | Blob | | | date | Date | |
| | | | | vote | Number | |

Although one embodiment of the present invention has been illustrated in the accompanying Drawings and described in the foregoing Detailed Description, it should be understood that the present invention is not limited to the disclosed embodiment, but is capable of numerous rearrangements, modifications and substitutions without departing from the spirit of the invention as set forth and defined by the following claims.

The invention claimed is:

1. A method for socially networking a plurality of users of mobile terminals, said method comprising the steps of:
    enabling a first user of a first mobile terminal to setup and view a personal list which includes selected other users of other mobile terminals;
    enabling the first user of the first mobile terminal to view presence information which indicates availability of the other users of the other mobile terminals;
    enabling the first user of the first mobile terminal to establish communications with one or more of the other users of the other mobile terminals;
    enabling the first user of the first mobile terminal to view posted content obtained by one or more of the other users of the other mobile terminals;
    enabling the first user to receive a pop-up notification on a television/computer when one or more of the other users of the other mobile terminals publishes new personal content; and
    enabling the first user to interact with the television/computer to view and rate the new personal content.

2. The method of claim 1, wherein said step of enabling the first user of the first mobile terminal to establish communications with one or more of the other users of the other mobile terminals further includes a step of establishing either a voice call or an Instant Message interaction with the one or more of the other users of the other mobile terminals.

3. The method of claim 1, wherein said step of enabling the first user of the first mobile terminal to view posted content obtained by one or more of the other users of the other mobile terminals further includes a step of voting on the posted content which can be a photo or video by the one or more of the other users of the other mobile terminals.

4. The method of claim 1, wherein said step of enabling the first user of the first mobile terminal to view posted content obtained by one or more of the other users of the other mobile terminals further includes a step of viewing a score keeper screen which displays a predetermined number of the posted content that received a high number of votes by all or a portion of the users of the mobile terminals.

5. The method of claim 1, further comprising a step of enabling the first user of the first mobile terminal to view a social gravity screen which indicates geographical location(s) of where the posted content was obtained by the one or more of the other users of the other mobile terminals.

6. The method of claim 1, further comprising a step of enabling the first user of the first mobile terminal to take a photo or video which is then subsequently distributed to the other users of the other mobile terminals.

7. A mobile terminal, comprising:
    a user interface;
    a camera; and
    a processor which implements an application that enables a user to:
        (a) setup and view a personal list which includes other users of other mobile terminals;
        (b) view presence information which indicates availability of the other users of the other mobile terminals;
        (c) establish communications with one or more of the other users of the other mobile terminals;
        (d) view posted content which is obtained by one or more of the other users of the other mobile terminals;

(e) receive a pop-up notification on a television/computer when one or more of the other users of the other mobile terminals publishes new personal content; and (f) interact with the television/computer to view and rate the new personal content.

8. The mobile terminal of claim 7, wherein said established communications include a voice call or an Instant Message interaction with the one or more of the other users of the other mobile terminals.

9. The mobile terminal of claim 7, wherein said processor implements the application which enables the user to vote on the posted content which can be a photo or video obtained by the one or more of the other users of the other mobile terminals.

10. The mobile terminal of claim 7, wherein said processor implements the application which enables the user to view a score keeper screen that displays a predetermined number of the posted content which received a high number of votes by all or a portion of the other users of the other mobile terminals.

11. The mobile terminal of claim 7, wherein said processor implements the application which enables the user to view a social gravity screen that indicates geographical location(s) of where the posted content was obtained by the one or more of the other users of the other mobile terminals.

12. The mobile terminal of claim 7, wherein said processor implements the application which enables the user to take a photo or video that is then subsequently distributed to the other users of the other mobile terminals.

13. A method for socially networking a plurality of users of mobile terminals, said method comprising the steps of:

enabling a first user of a first mobile terminal to setup and view a personal list which includes selected other users of other mobile terminals;

enabling the first user of the first mobile terminal to view presence information which indicates availability of the other users of the other mobile terminals;

enabling the first user of the first mobile terminal to establish communications with one or more of the other users of the other mobile terminals;

enabling the first user of the first mobile terminal to view posted content obtained by one or more of the other users of the other mobile terminals;

enabling publishing that the first user of the first mobile terminal has taken a photo or video; and notifying the other users of the other mobile terminals about the photo or video and then subsequently distributing the photo or video to the other users of the other mobile terminals.

14. A mobile terminal, comprising:

a user interface;

a camera; and a processor which implements an application that enables a user to:

(a) setup and view a personal list which includes other users of other mobile terminals;

(b) view presence information which indicates availability of the other users of the other mobile terminals;

(c) establish communications with one or more of the other users of the other mobile terminals; and (d) view posted content which is obtained by one or more of the other users of the other mobile terminals, wherein the application further enables:

(e) publishing that a photo or video has been taken by the user, and wherein the application; and (f) sending of the photo or video to a server that enables the photo or video to be subsequently distributed to the other users of the other mobile terminals upon the other users of the other mobile terminals accepting a notification of the photo or video.

* * * * *